United States Patent Office 2,850,834
Patented Sept. 9, 1958

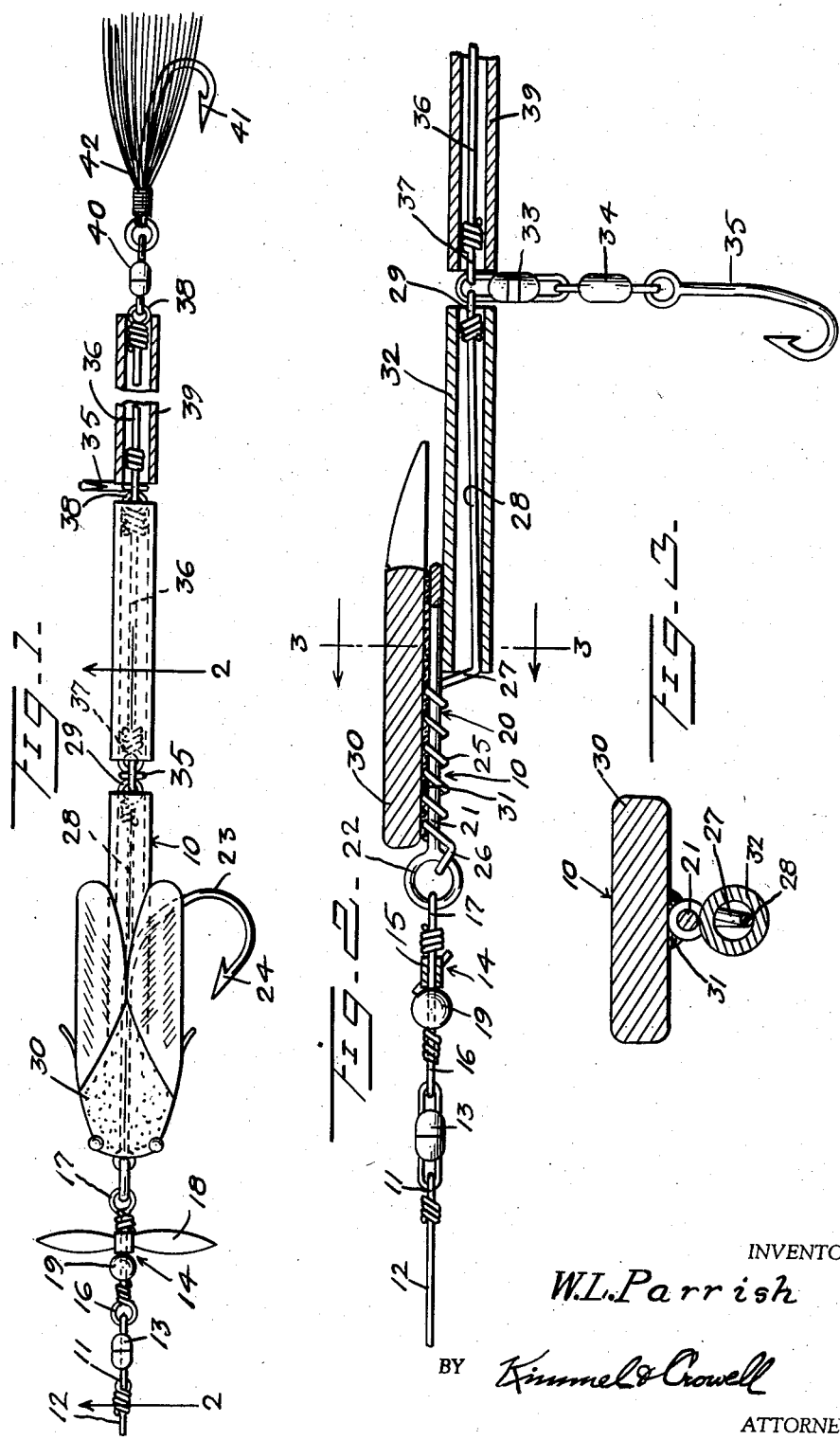

2,850,834

FISH LURE

Walter L. Parrish, Columbus, Ga.

Application December 3, 1956, Serial No. 625,947

1 Claim. (Cl. 43—42.11)

The present invention relates to fish lures, and more particularly to articulated fish lures having natural bait characteristics.

The primary object of the invention is to provide a fish lure having a bug or insect bait associated therewith and having multiple hooks on an articulated extension.

Another object of the invention is to provide a fish lure of the class described above which is inexpensive to manufacture, effective in luring fish, and which can be adjusted by adding or removing hooks and hook supports.

Other objects and advantages will become apparent in the following specification when considered in the light of the attached drawings, in which:

Figure 1 is a top plan view of the invention.

Figure 2 is an enlarged fragmentary longitudinal cross-section taken along the line 2—2 of Figure 1, looking in the direction of the arrows.

Figure 3 is an enlarged transverse cross-section taken along the line 3—3 of Figure 2, looking in the direction of the arrows.

Referring now to the drawings in detail wherein like reference characters indicate like parts throughout the several figures, the reference numeral 10 indicates a fish lure constructed in accordance with the invention.

The fish lure 10 is connected to the terminal end 11 of a conventional fishing line 12 by means of a detachable connector 13 of conventional design. A spinner, generally indicated at 14, is provided with a central shaft 15 having a loop 16 formed at one end of a loop 17 formed at the opposite end. The loop 16 is connected to the detachable connector 13 and the shaft 15 carries a spinner blade 18 journalled thereon and held in place by a bead 19 likewise mounted on the shaft 15.

A fish hook, generally indicated at 20, has the shank portion 21 and eye 22 connected to the loop 17 of the spinner 14, an arcuate lateral portion 23 extending from the rear of the shank portion 21 and a barbed point 24. The fish hook 20 is of conventional design and has a wire 25 coiled about the shank 21 with its terminal end 26 secured in the eye 22. The wire 25 has a downwardly offset portion 27, as best seen in Figure 2, and a rearwardly extending portion 28. A loop 29 is formed on the rear terminal end of the rearwardly extending portion 28 of the wire 25 for reasons to be assigned. A natural or artificial insect of the cicada type 30 is secured to the shank 21 of the hook 20 and the wire 25 by means of adhesive 31, or other suitable material.

An elongated tube 32 is engaged over the rearwardly extending portion 28 of the wire 25 with the forward end thereof in engagement with the downwardly offset portion 27 of the wire 25 and the rear end portion supported by the loop 29, as best shown in Figure 1. A separable fastener 33 is secured to the loop 29 and is provided with a swivel 34 depending from the other end thereof having a fish hook 35 suspended thereon.

A wire shaft 36 is provided with loops 37 and 38 at its opposite ends and has an elongated tube 39 mounted thereon and supported by the loops 37 and 38. The loop 37 is secured to the separable fastener 33, as viewed in Figure 2, so that the shaft 36 is axially aligned with the rearward extension 28 of the wire 25.

A hook 35 is suspended from the rear end portion of the tube 39 in the same manner that the hook 35 is suspended from the front portion thereof and additional shafts 36 and tubes 39 are arranged in axial relation to the previously attached tubes 39 until the lure 10 is as long as desired. A swivel 40 is secured to the loop 38 of the rearmost shaft 36 and has a hook 41 carrying imitation feathers 42 secured thereon by conventional means.

In the use and operation of the invention, the lure 10 is drawn through the water in a conventional manner and simulating a cicada 30 attracts fish so that they will become attached to one of the hooks 41, 35 or 20.

The lure 10 may be varied in its appearance by adding tubes 39 thereto or removing the tubes 39 and the tubes 32 therefrom to suit the conditions.

Having thus described the preferred embodiment of the invention, it should be understood that numerous structural modifications and adaptations may be resorted to without departing from the scope of the appended claim.

What is claimed is:

A fish lure comprising a fish hook, a shank extending from said fish hook, an attaching loop formed on the free end of said shank, a wire having one end thereof secured to said loop and the opposite end thereof coiled about said shank, a downwardly offset portion formed integrally on the end of said wire coiled about said shank, a rearwardly projecting extension formed on said offset portion integral therewith, a simulated cicada secured to the shank of said hook on the side thereof opposite said offset portion, a second hook secured to a loop on the terminal end of said extension, and a tubular member encompassing said extension supported by said loop.

References Cited in the file of this patent

UNITED STATES PATENTS

| 2,481,789 | Smith | Sept. 13, 1949 |
| 2,791,059 | Holmberg | May 7, 1957 |

FOREIGN PATENTS

| 3,851 | Great Britain | 1895 |